United States Patent [19]

Kinoshita

[11] 4,064,958
[45] Dec. 27, 1977

[54] TRANSMISSION FOR SINGLE-SHAFT GAS TURBINE ENGINE

[75] Inventor: Keijiro Kinoshita, Yokohama, Japan

[73] Assignee: Nissan Motor Co., Ltd., Japan

[21] Appl. No.: 681,172

[22] Filed: Apr. 28, 1976

Related U.S. Application Data

[63] Continuation of Ser. No. 514,915, Oct. 15, 1974, abandoned.

[30] Foreign Application Priority Data

Oct. 23, 1973 Japan .............................. 48-119119

[51] Int. Cl.$^2$ ............................................. B60K 17/10
[52] U.S. Cl. ............................... 180/66 A; 60/363; 74/731
[58] Field of Search ............... 180/66 A, 70 R, 66 R; 60/363, 340, 330, 327; 74/688, 731

[56] References Cited

U.S. PATENT DOCUMENTS

| 2,142,199 | 1/1939 | Lysholm et al. | 60/363 X |
| 2,328,141 | 8/1943 | Haltenberger | 180/70 X |
| 2,631,427 | 3/1953 | Rainbow | 180/66 A X |
| 2,727,602 | 12/1955 | Saives | 180/66 A X |
| 3,543,873 | 12/1970 | Toy | 180/66 A X |
| 3,729,933 | 5/1973 | Knebel | 60/340 |

FOREIGN PATENT DOCUMENTS

| 285,970 | 2/1928 | United Kingdom | 180/66 R |

Primary Examiner—Joseph F. Peters, Jr.
Assistant Examiner—Milton L. Smith
Attorney, Agent, or Firm—Robert E. Burns; Emmanuel J. Lobato; Bruce L. Adams

[57] ABSTRACT

A hydraulic coupling and a hydraulic torque converter followed by a forward-reverse gearbox, arranged in series, prevent engine stall of a single-shaft gas turbine engine which has poor torque characteristics at low engine speed.

1 Claim, 4 Drawing Figures

TRANSMISSION FOR SINGLE-SHAFT GAS TURBINE ENGINE

This is a continuation of application Ser. No. 514,915, filed Oct. 15, 1974 and now abandoned.

BACKGROUND OF THE INVENTION

The present invention relates to a transmission for single-shaft gas turbine engines for automobiles, particularly passenger cars.

Potentially low costs are stimulating development of a single-shaft gas turbine engine for passenger cars. Against this cost advantage must be balanced the increased cost of providing a transmission that must be carefully matched with the engine and the vehicle to compensate for the inherent torque characteristics of the engine. Torque of the engine is quite small in the low engine revolution range and rises steeply up to the maximum as the engine speed increases. For the engine, a transmission including an hydraulic torque converter followed by a forward-reverse gear box has been proposed. The transmission input element is a torque converter impeller shaft connected directly to the engine shaft, while the output element is a gearbox output shaft drivingly connected to the vehicle driving wheels. As the torque converter has a slippage band, the engine can be started without picking up load. However, since the slippage band is narrow, the engine can not increase its speed without picking up load up to a certain speed range where the engine will develop a torque large enough to start moving the vehicle. Thus difficulty in starting the vehicle moving and unstable performance at low vehicle speeds, resulting frequently in engine stalls, were unavoidable with the conventional transmission. The present invention consists of a transmission avoiding the abovementioned shortcomings of such transmission.

SUMMARY OF THE INVENTION

It is an object of the present invention to provide a transmission for a single-shaft gas turbine engine for automobiles, which transmission permits the engine to idle at higher speeds to improve the vehicle starting and performance during low vehicle speed driving.

It is a further object of the present invention to provide a transmission which includes a hydraulic torque converter followed by a forward-reverse gearbox.

In accordance with a transmission of the present invention the engine will not pick up load until the engine produces sufficient torque large enough for starting the vehicle to move.

BRIEF DESCRIPTION OF THE DRAWINGS

The present invention will become apparent from the following description, read in conjunction with the accompanying drawings, in which:-

DESCRIPTION OF THE PREFERRED EMBODIMENT

Figure 1:
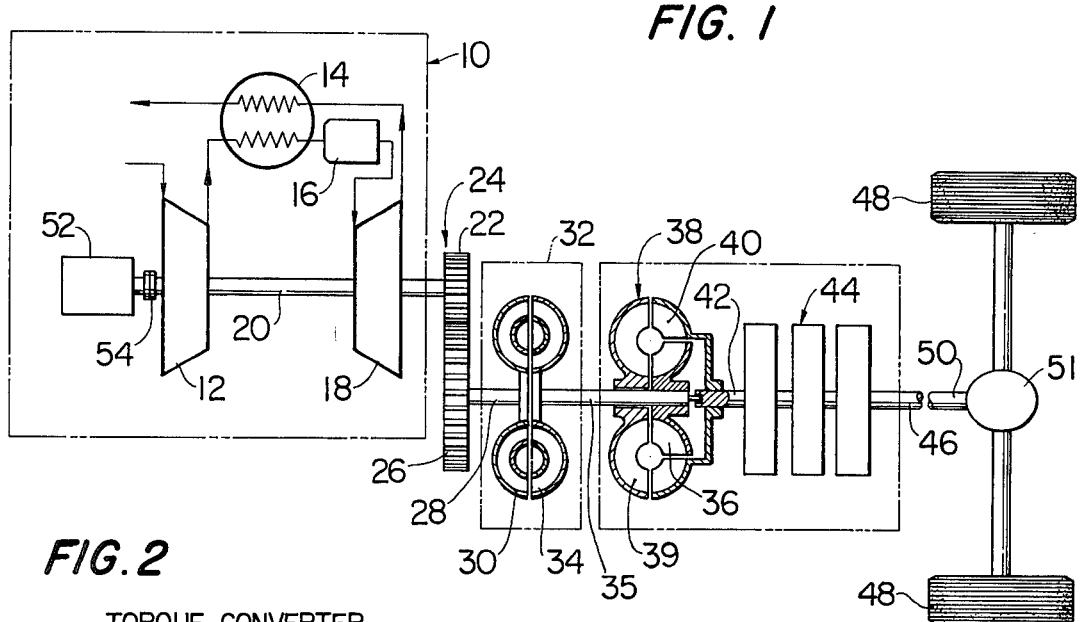
FIG. 1 is a diagrammatic view of an automotive power drive including a transmission of the present invention.
Figure 2:
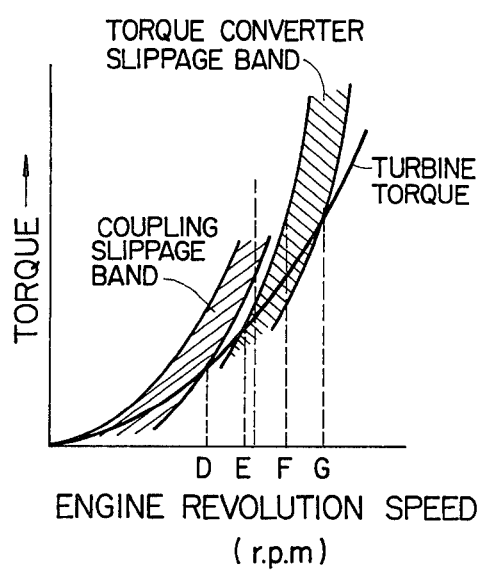
FIG. 2 is a graph showing respective slippage bands of an hydraulic coupling and an hydraulic torque converter employed in the transmission illustrated in FIG. 1.

Referring particularly to FIG. 1 of the accompanying drawings, there is shown a single-shaft gas turbine engine generally indicated at 10. The engine includes an air compressor 12 which discharges compressed air through a heat exhchanger 14 to a combustor 16 which supplies the combustion product to a turbine 18 to rotate the latter, and exhaust gas is discharged from the turbine 18 through the heat exchanger 14 to the exterior of the engine. The turbine drives the compressor 12 through a turbine shaft 20 which carries an input gear 22 of a reduction gear train generally indicated at 24. Output gear 26 of the gear train 24 meshes with the input gear and is carried by an engine output shaft 28 which is drivingly connected to the impeller element 30 of a hydraulic coupling generally indicated at 32, the turbine element 34 of which is drivingly connected through a shaft 35 to an impeller element 36 of a three-element-type hydraulic torque converter generally indicated at 38. The torque converter includes a stator element 39 and a turbine element 40 which is drivingly connected through a gearbox input shaft 42 of a three speed gearbox generally indicated at 44, an output shaft 46 of which is drivingly connected to vehicle driving wheels 48 through a propeller shaft 50 and a final reduction gear unit 51. For starting the engine 10, a starter 52 is provided which can be selectively coupled to or uncoupled from the turbine shaft 20 of the engine by a clutch 54.

Single-shaft gas turbine engine 10 illustrated is well known to the art and per se is not the invention. Hydraulic coupling 32 illustrated in FIG. 1 is of the type which is filled with working medium throughout its operating range. Hydraulic torque converter 38 is of the type which is filled with working medium and acts as a hydraulic coupling when the speed of shaft 35 exceeds a predetermined rotational speed. Gearbox 44 is constructed and arranged to provide three forward speeds and one reverse speed.

Figure 3:
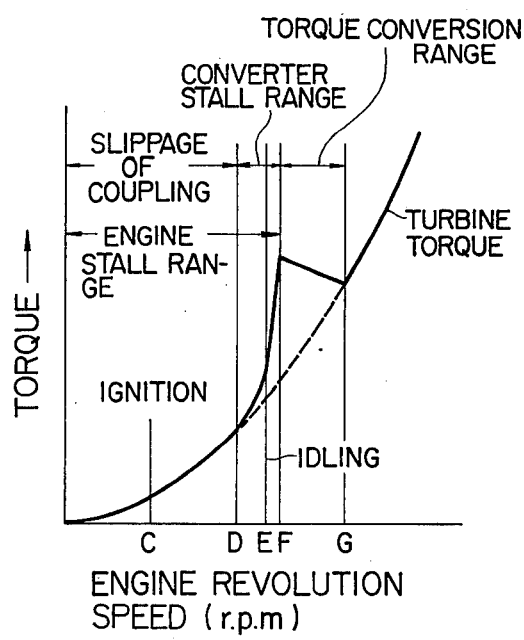
FIG. 3 is a graph showing a torque versus engine revolution speed curve.

The cooperative function of hydraulic coupling 32 with hydraulic torque converter 38 will be well understood when perusing the following paragraphs in connection with FIG. 3 as well as FIG. 1.

In operation of the drive of FIG. 1, starter 52 is coupled by a clutch 54 to the turbine shaft 20 of the engine 10 to crank up the engine to a point C (read off on the horizontal scale of graph in FIG. 3) when the fuel is ignited. The starter is left engaged until the engine 10 is accelerated to or beyond a self-sustaining speed for engine operation and then the clutch 54 is uncoupled.

Figure 4:
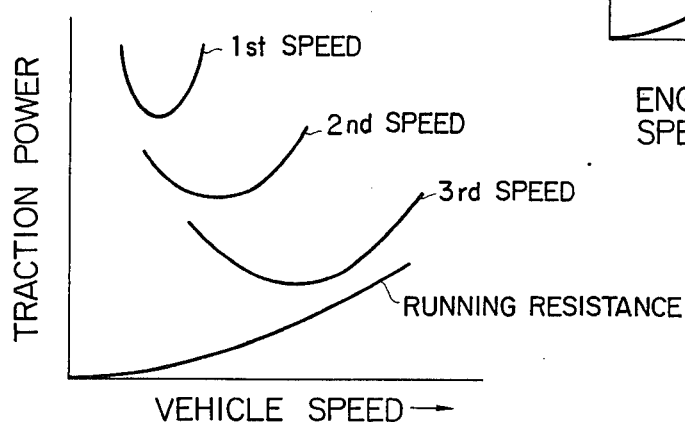
FIG. 4 is a graph showing the performance characteristics of the transmission illustrated in FIG. 1.

During the engine start and the subsequent acceleration of the engine up to a point D (in FIG. 3), hydraulic coupling 32 slips and there is no transmission of engine power to shaft 35 carryng impeller element 36 of torque converter 38. When the engine speed is within the D-F range (in FIG. 3) as the engine speeds up, the engine power is gradually transmitted to the impeller element 36 of the torque converter 38. However, within this engine speed range, the torque converter 38 slips and there is substantially no power transmission to the turbine element 40, and thus the vehicle is still at a standstill. The idling speed of the engine 10 should be set at a point E which is within the D-F range (in FIG. 3). In FIG. 3, the torque converting range of the torque converter 38 is shown as the F-G range wherein hydraulic torque converting drive connection is established through hydraulic coupling 32 and hydraulic torque converter 38 and gearbox output shaft 46 drives the vehicle driving wheels 48. As the engine speed exceeds a point G beyond which point the engine torque produced by the engine 10 becomes sufficiently large, hydraulic direct drive connection is established since the torque converter 38 here changes to act as a hydraulic coupling. Here the engine directly drives the vehicle driving wheels 48 through gearbox 44. FIG. 4 illustrates performance characteristics of the gearbox 44.

It will now be seen that engine 10 is prevented from stalling during low vehicle speed because the idling speed is increased and the engine gradually picks up load until it can provide sufficient torque for moving the vehicle.

From the preceding description, it will now be appreciated that ease of vehicle starting and stable performance at low vehicle speed are accomplished by the transmission of the present invention.

What is claimed is:

1. In an automobile, a single-shaft gas turbine engine having a combustor, a compressor and a turbine, a single-shaft directly connecting said compressor and said turbine;
   a hydraulic coupling having an impeller element driven from said turbine and a turbine element hydraulically driven by said impeller element;
   said hydraulic coupling having a slippage band comprising a range of speeds in which it slips at lower speeds of rotation of said impeller element corresponding to speeds at which said engine will stall;
   a reduction gear directly connected to said single shaft and having an output shaft thereof connected to said impeller element;
   a hydraulic torque converter having an impeller element connected directly to the turbine element of said hydraulic coupling to be driven thereby, a stator, and a turbine element hydraulically driven from the last-mentioned impeller element;
   said hydraulic torque converter having a slippage band comprising a range of speeds in which it slips, greater than the speeds of rotation at which said hydrualic coupling slips and corresponding to speeds at which said engine will stall;
   a forward-reverse change speed gearbox having an input shaft directly connected to the turbine element of said hydraulic torque converter to be driven thereby and an output shaft;
   said turbine developing a torque in which said engine will not stall in an upper range of speeds of said torque converter slippage band;
   at least one driving wheel;
   means drivingly connecting said wheel to the output shaft of said change speed gearbox;
   whereby in a range of lower speeds of rotation of the turbine said hydraulic coupling slips and in a range of speeds of rotation of said turbine higher than the last-mentioned range the hydraulic torque converter slips and said turbine is not loaded at stalling speeds thereof and is loaded only at speeds in which it develops a torque at which it will not stall.

* * * * *